Figure 1:
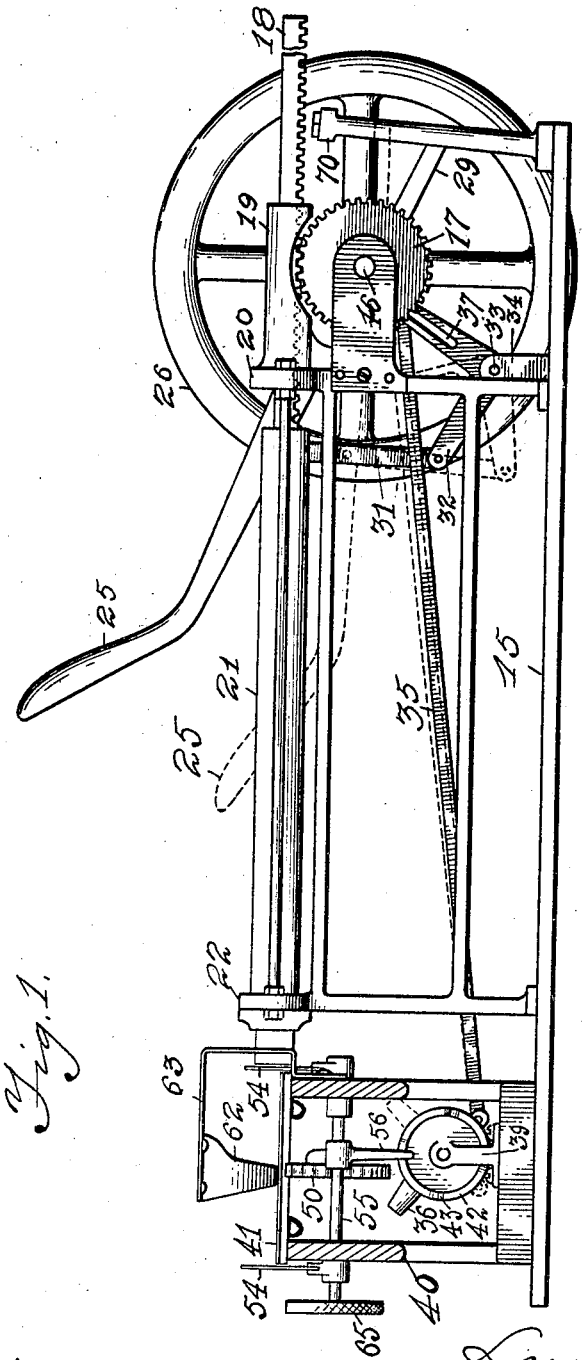

L. LUCAS.
MACHINE FOR MAKING INCENSE STICKS.
APPLICATION FILED FEB. 16, 1921.

1,438,446.

Patented Dec. 12, 1922.
4 SHEETS—SHEET 1.

Witness
J. E. Nordstrom
C. V. Swanson

Inventor
Louis Lucas
By S. Arthur Baldwin
Attorney

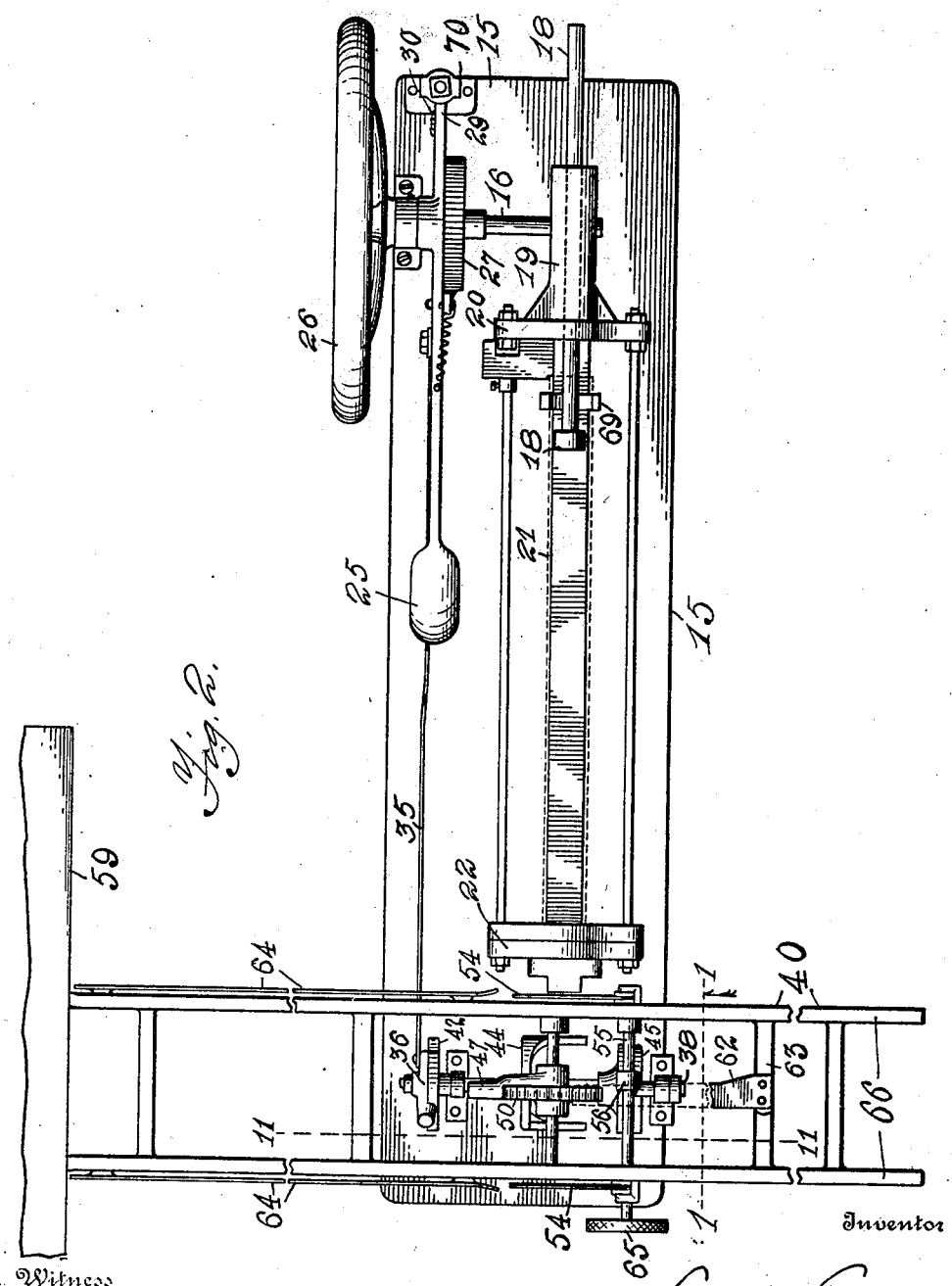

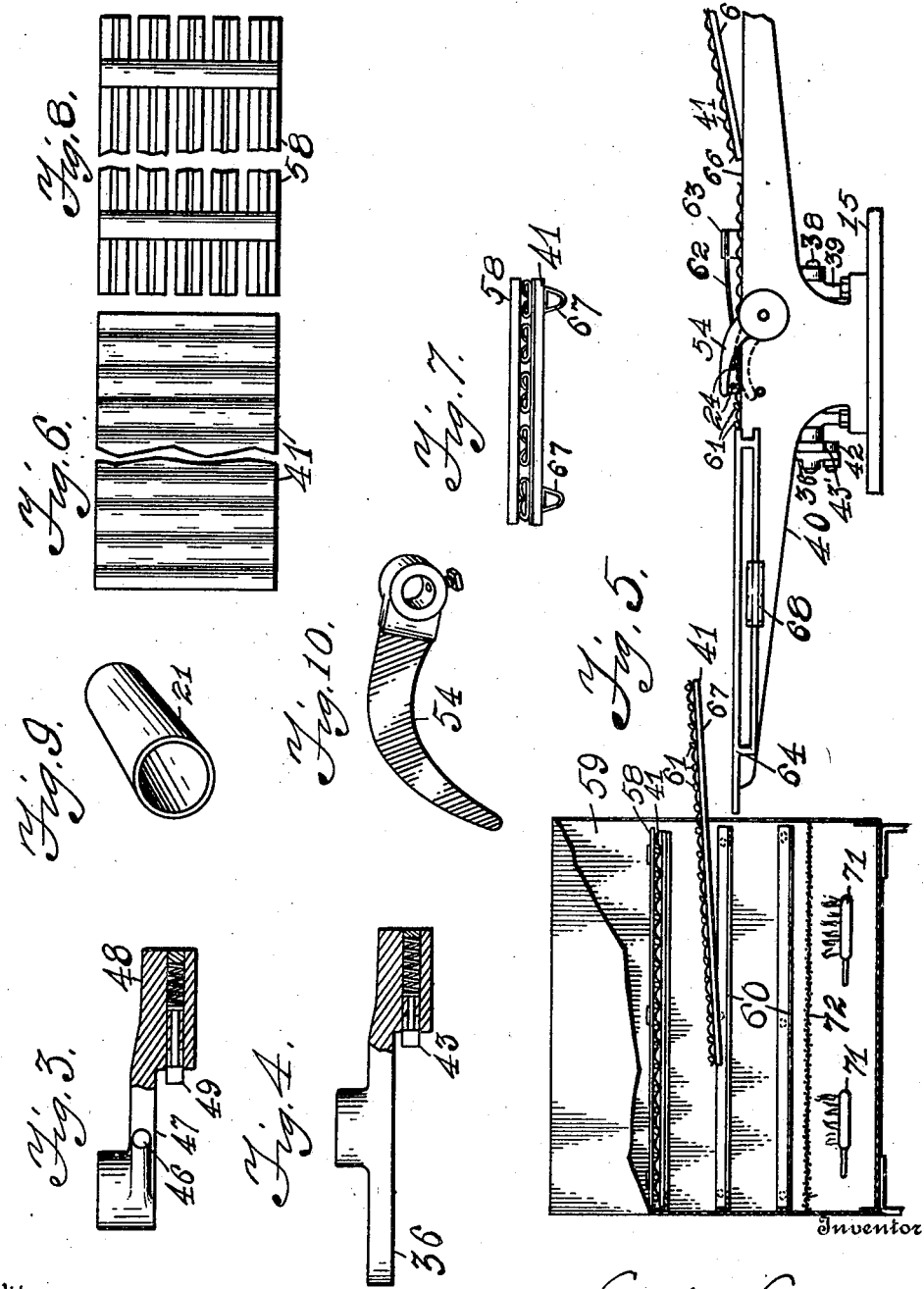

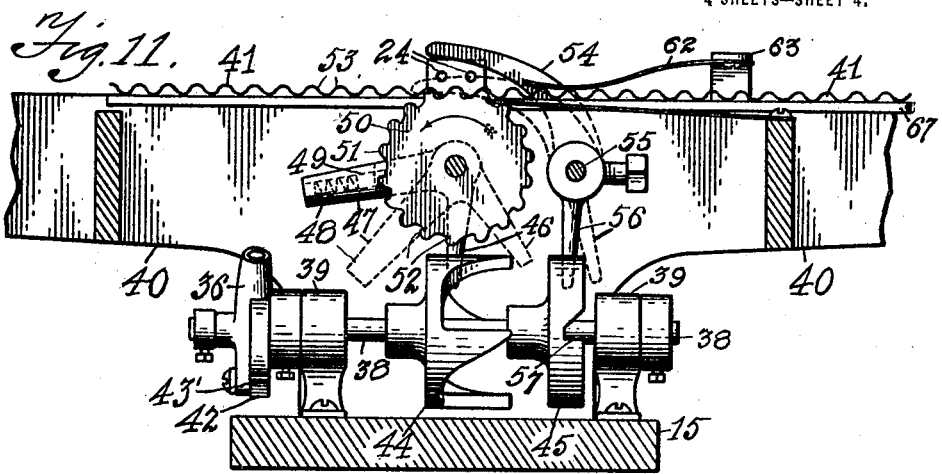
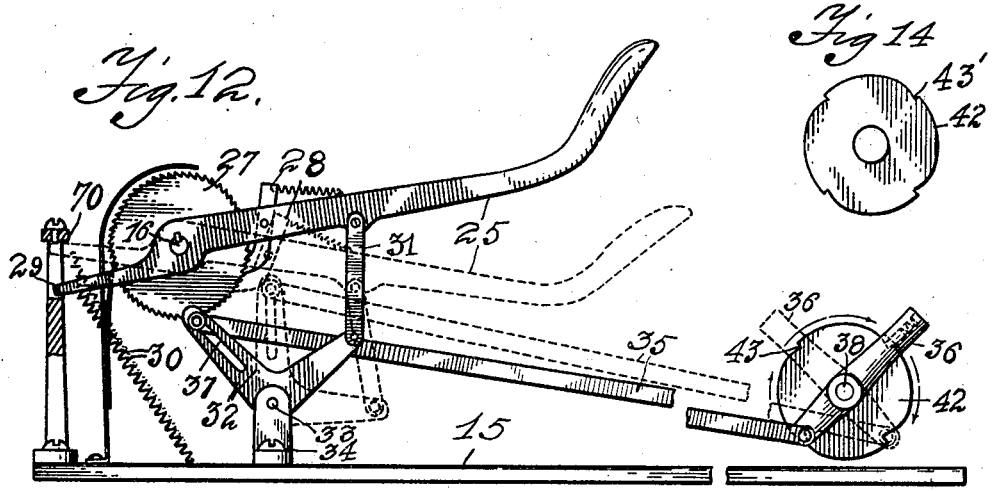
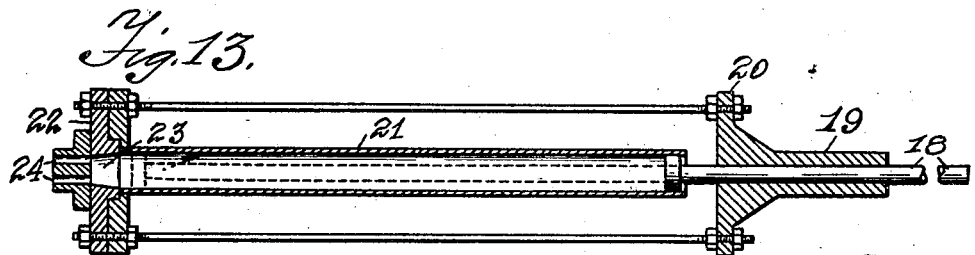

Patented Dec. 12, 1922.

1,438,446

UNITED STATES PATENT OFFICE.

LOUIS LUCAS, OF JAMESTOWN, NEW YORK.

MACHINE FOR MAKING INCENSE STICKS.

Application filed February 16, 1921. Serial No. 445,488.

*To all whom it may concern:*

Be it known that I, LOUIS LUCAS, a citizen of the United States, residing at the city of Jamestown, in the county of Chautauqua and State of New York, have invented certain new and useful Improvements in Machines for Making Incense Sticks, of which the following, taken in connection with the accompanying drawings, is a specification.

The invention relates to machines for shaping plastic materials as for example incense into sticks; and the object of the improvement is to provide a machine in which the plastic material is formed in solid sticks by being pressed through openings of the desired shape, and to cut into sticks of the desired length, corrugated drying pans or racks being provided to receive and support the soft plastic sticks thereon in the spaced corrugations or grooves, mechanism also being provided to move said pans or racks a step at a time as the grooves are filled; and second, to provide an oven in connection with said shaping machine for plastic material to receive said pans or racks therefrom to dry or harden said sticks, so that they will stand upright in a suitable holder; and the invention consists in the novel features and combinations hereinafter set forth and claimed.

In the drawings, Figure 1 is a side elevation of the shaping portion of the machine, and a sectional view of the pan or rack supporting portion, showing mechanism to move said pan or rack a step at a time. Fig. 2 is a top plan view of the machine without the drying pan or rack, showing the mechanism for shaping the plastic material, as well as the step by step moving mechanism for the corrugated drying rack, the tracks for which are at right angles to the shaping portion of the machine with the drying oven at the delivery end. Fig. 3 is a sectional view of one of the dogs; and Fig. 4 a similar view of another of the dogs for moving said drying pan or rack a step at a time. Fig. 5 is a side elevation of the drying rack step by step moving and length cutting portion of the machine, showing a loaded drying rack in process of movement from the supporting track of the machine into the drying oven at one end of said tracks and an empty rack entering the machine at the other end. Fig. 6 is a plan view of one of the corrugated drying pans or racks with the central portion broken away; and Fig. 7 is a sectional view at line 7—7 in Fig. 6 with slatted cover showing the preferred construction arrangement of the drying pan and rack cover. Fig. 8 is a top plan view of the slatted rack cover for holding the plastic material or sticks in form upon the drying pan or rack, the central portion being broken away. Fig. 9 is a perspective view of the tubular barrels for the pressure plunger. Fig. 10 is a detail perspective view of one of the knives for cutting the plastic material. Fig. 11 is a lengthwise sectional view at line 11—11 in Fig. 2, showing the step by step actuating mechanism for the drying rack. Fig. 12 is a vertical sectional view at line 12—12 in Fig. 2 showing a side elevation of the manual actuating mechanism for the entire machine. Fig. 13 is a horizontal sectional view of the plunger and plunger barrel mechanism for shaping the plastic material by pressure through orifices at the end of said plunger barrel. Fig. 14 is a side elevation of the notched wheels for moving the drying pan a step at a time by means of the toothed dog and link connection thereto.

Like characters of reference refer to corresponding parts in the several views.

The numeral 15 designates a frame for the shaping portion of the machine, which is T-shaped and has mounted thereon at one end the shaft 16 in suitably bracketed journals upon which the gear 17 is mounted, which meshes in a combination rack and plunger stem 18. The plunger-rack 18 is supported in a tubular housing 19 on the frame 15, the housing 19 and bracketed journals for the shaft 16 being supported upon suitable uprights in the frame 15.

The plunger-rack 18 is toothed on its under side forming the rack portion and has a head which fits within the plunger barrel or tube 21 to press the plastic material therethrough. The plunger barrel or tube 21 is removable and supported upon the plunger 18 in front of the head 20 at one end, and in a shoulder upon the standard 22 at the other end, so as to cover the opening 23 and press the plastic material through the two formative orifices or mouths 24 on said standard 22.

The gear 17 is actuated by means of a lever 25 mounted upon shaft 16 and a hand or balance wheel 26 and toothed ratchet 27 upon said shaft 16, as shown in Figs. 4 and 9. A spring dog 28 is provided on the lever 25 which engages in the ratchet teeth of the toothed ratchet 27. The lever 25 has the end extension 29 to which is attached one end of a spring 30, the other end being attached to the frame 15 to assist in returning the lever 25 to normal position in its up and down movement, which up and down movement actuates the pinion 17 and rack-plunger 18, pressing the plastic material through the plunger barrel 21.

Simultaneously with the action of the rack-plunger 18 the lever 25 actuates the remaining mechanism of the machine by means of a link 31, which is pivotally attached to the under side of the lever 25 and connects to a bell crank 32 which is pivotally mounted at 33 in the bracket 34 on the frame 15. The second link 35 connects the other arm of the bell crank 32 to one end of a dog 36, so as to reciprocally actuate said dog by the reciprocation of the lever 25. The end of the link 35 is adjustable by being pivotally attached in a slot 37 in the arm of the bell crank 32 in order to adjust the speed of the actuation of the dog 36.

The dog 36 is pivotally mounted on a shaft 38 which has suitable journals 39 on the portion 40 of the frame 15, which portion 40 is at right angles to the plunger portion so as to move the drying racks 41 across in front of the mouths of the orifices 24 on the portion 40 to thereby receive the sticks of plastic material as they are formed by being pressed forth from said formative orifices 24. The ratchet dog 36 engages in a ratchet wheel 42, which preferably has spaced teeth 43 therein at about one-fourth of the circumference thereof so as to rotate said ratchet wheel 42 about one-fourth rotation when the lever 25 moves upward. The dog 36 has a spring toothed end 43, which is shaped to engage in the toothed opening 43′ and hold against the ratchet wheel, thereby rotatably moving the same when said lever 25 moves upward, and escaping from the V-shaped opening 43 for the tooth as the dog 36 is moved by the link connection 35 to the lever 25. A cam toothed ratchet 44 is also provided on the shaft 38 to rotate therewith and a third ratchet wheel 45 is provided on said shaft 38, each of the ratchet wheels 44 and 45 having toothed openings therein corresponding to the one-fourth toothed openings 43′ of the ratchet wheel 42.

The cam toothed ratchet wheel 44 is engaged by the downwardly projecting arm 46 of the bell crank 47, the other arm 48 being shaped to receive the spring dog 49 in the end thereof, which spring dog 49 engages in the undulating or curved teeth of the ratchet wheel 50, which undulating or curved teeth 51 are shaped on one side as shown at 52 to engage the straight side of the dog 49 and thereby move the wheel 50 one step. The size of the teeth 51 is in proportion to the size of the undulations 53 of the drying rack 41, the openings between the upwardly projecting undulations of the rack 41 being fitted to receive a stick of the soft, plastic material as it is pressed forth from the orifices 24. It is evident as the cam-shaped ratchet 44 is rotated, the arm 46 will pass up the incline or cam-shaped side of the quartering teeth of ratchet 44, thereby moving said bell crank shaped dog and the wheel 50 one step, carrying the drying rack therewith.

In order to cut the plastic material into sticks of the desired length, a pair of thin knives 54 are provided, one to each outer side of the two rails of the portion 40, the knife on the side of the orifices 24 pressing firmly against the mouths of said orifices and cutting the plastic material squarely across said mouths. In order to reciprocally move the knives 54 downward to perform their length cutting office, the said knives are each pivotally mounted on a shaft 55 rotatively mounted in the portion 40. The shaft 55 has a downwardly projecting arm 56 keyed thereto which engages in the cam-shaped openings or teeth 57 of the ratchet wheel 45. It is apparent that the ratchet wheels 44 and 45 are simultaneously actuated and that the knives 54 will be moved downward by the ratchet wheel 45 at the same time that the ratchet wheel 44 is actuated, thereby cutting both ends of the two sticks of the soft material as they come forth from the orifices 24, and permitting the same to drop into grooves in the corrugated drying rack 41. In order to hold said sticks in a straight position within the grooves of the corrugated rack while drying, a slatted cover rack 58 is provided, which fits over the drying rack 41, having lengthwise slots therethrough to permit the moisture or chemicals to escape through the lengthwise slots of the rack 58.

A drying oven 59 is provided, having suitable holding racks 60 to receive the racks 41 therein, the supports for the racks 60 being spaced so that a large number of the racks 41 may be placed in the drying oven 59 at one time. After the chemicals or moisture is driven from the plastic material by the heat, the racks 41 are withdrawn from the oven 59, the covers 58 are removed and the dry, stiff sticks 61 slip easily from the ends of the grooves in the drying racks 41 into a suitable receptacle.

The drying racks 41 preferably have the tubular lengthwise stiffening strips 67 attached thereto, as shown in Figs. 5, 7 and 11. The strips 67 give added strength and rigidity and are convenient for handling the racks 41. The drying racks 41 are fitted to slide easily upon the parallel ways 66 of the part 40 of the frame and are held firmly in position so as not to be moved therefrom when once they enter into mesh with the cog wheel 50 by means of the lengthwise leaf spring 62 which is attached to an arm 63 on the frame 40 which extends over the racks 41. As the racks 41 are moved along under the spring 62 by the rotation of the cog wheel 50 toward the drying oven 59, they are held in alinement by means of the spring strips 64 at each side and which are mounted in clips 68 upon the side of the portion 40 so as to extend upward a spaced distance from the sliding ways 66 at each side, as shown in the top plan view in Fig. 2 and the side elevation Fig. 5.

The shaft 55 upon which the knives 54 and arm 56 are mounted is provided with a hand wheel 65 for the manual actuation of said shaft 55 in the control of said knives and arm to release or actuate the same.

In the operation of the machine, the racks 41 are placed on the spaced ways 66 so that the first two depressions in the corrugated rack 41 lie immediately beneath the spaced openings 24, thereby placing them in position to receive the two sticks of plastic incense as they are pressed forth out of the orifices or spaced openings 24 by the plunger 18, the knives 54 having been turned to the raised position by the hand wheel 65. A plurality of plunger barrels or tubes 21 are provided and filled with the incense material in plastic form. One of the barrels 21 is placed in position within the head 22 at one end and dropped onto the rest 69 at the other end and the head of the plunger 18 is inserted into the end of the barrel 21, the rest 69 and head 22 holding said barrel in alinement with said plunger 18.

All the parts are now in position with the machine loaded ready for actuation by the up and down movement of the lever 25 as shown in solid line and dotted outline in Fig. 12, which up and down movement actuates the toothed ratchet 27 28 thereby turning the shaft 16 and toothed gear 17, moving forward the plunger 18 by means of the toothed rack on the under side of said plunger 18, thereby pressing the plastic mass in the plunger barrel 21 out through the formative orifices 24 upon the rack 41. Meantime, the up and down movement of the lever 25 actuates the bell crank 32 and link 35 by means of link 31 connected to said bell crank to actuate the spring dog 36 and turn the shaft 38 by means of the quarter notched or toothed wheel 42, thereby turning the quarter cam toothed ratchet wheels 44 and 45, the cam toothed ratchet wheel 44 turning the round toothed gear 50 by means of the bell crank spring dog 47 49, thereby moving the rack 41 forward two steps or undulations; simultaneously the toothed ratchet wheel 45 is turned thereby actuating the arm 56 and causing the two spaced knives 54 to move downward severing the plastic material into stick lengths, which stick lengths preferably correspond to about the width of the rack 41, the knives 54 just escaping the sides of the sheet metal corrugated rack 41 as they pass downward.

When the lever 25 reaches its lowest limit and is stopped by the end 29 of said lever 25 striking against the cross bar 70, the release of said lever 25 permits it to spring back to its normal raised position by means of the spring 30 attached to the lever end 29 at one end, and the base of the frame 15 at the other, thereby returning all the actuated parts to their normal position ready for re-actuation and the duplication of the operation above described. Said continued re-actuation moves the racks 41 along the sliding ways 66 into the drying oven 59. As fast as the racks 41 are filled, they are covered and the sticks 61 are thereby held in form by placing a cover 58 upon each rack, which arrangement holds the plastic sticks in position upon the rack so that said rack 41 may be lifted and handled as desired in order to fill all the holding racks 60 in the drying oven. This arrangement renders the process consecutive and progressive as the actuation of the machine fills the racks and simultaneously moves them forward into the drying oven. When said drying oven is filled, the door is closed and the moisture is taken from the plastic incense sticks by heat, which may be for convenience from gas burners 71 placed beneath a wire screen 72 thereby preventing the flame reaching the inflammable sticks 61.

As shown in Fig. 2, the frame 15 is T-shaped, the part bearing the lever 25 and plunger mechanism 18 forming as it were the stem of the T, and the portion forming the ways 66 for the racks 41 is placed crosswise of one end of said stem portion thereby forming the head of the T-shaped frame. This shape is necessary in order to provide the ways 66 for the rack 41 so that said rack will progress along said ways 66 toward the drying oven 59 and across the mouths of the openings 24 through which the plastic material is forced to shape the sticks 61 and drop them in the depressions of the corrugated racks 41, which corrugated depressions are spaced to correspond to the spaced openings 24. Making the spaced openings 24 in the upright 22 opposite the end of the barrel 21 when in the mounted position permits said barrels to be made open-ended, that is, simple metal tubes which can be easily cleansed and loaded, and insures the same size opening for the sticks from all of the barrels.

What is claimed is:

1. In a machine for making sticks from plastic material, means to shape the material into stick form, removable receiving means for the stick, a pair of cutting means arranged on opposite sides of the receiving means and between which the receiving means is movable, means to actuate each of the cutting means in unison so as to cut the material into predetermined lengths equalling the width of the receiving means and while the material is seated on said receiving means, side guides for the receiving means, and spring pressed means engaging on top of the receiving means to removably hold same in place.

2. In a machine for making sticks from plastic material, means to express the material in stick form, a removable receiving rack for the sticks, a pair of cutters arranged adjacent to and on opposite sides of the receiving means, means to move the rack across the delivery end of the expressing means, means to actuate the expressing means, means to actuate the cutters to cause same to cut the sticks while the latter are on the rack and of lengths equal to the width of the rack, side guides for the rack, and spring pressed means engaging on top of the rack to hold same engaged with the moving means thereof and to allow of removal of the rack.

3. In a machine for making sticks from plastic material, means to express the material in stick form, a receiving rack for the sticks, including a metal sheet corrugated to form concavo-convex parts on each side face so as to receive the sticks in the concave parts on the upper side face of the metal sheet and means to move the rack including a pinion the teeth of which are formed to engage in the concave parts on the under side face of the metal sheet.

4. In a machine for making sticks from plastic material, a cylinder having a plunger therein, means to actuate the plunger including a ratchet, a pivoted lever having a pawl to engage and rotate the ratchet, a bell crank pivoted below the lever, a link connecting one arm of the bell crank to the lever, a sliding rack, cutter means, a shaft, means operated by the shaft to slide the rack, means also actuated by the shaft to actuate the cutter means, a ratchet connected to the shaft, a pawl engaging the last named ratchet, and a link connecting the other arm of the bell crank to the last named pawl.

5. In a machine for making sticks from plastic material, a cylinder having a plunger therein, means to actuate the plunger including a ratchet, a pivoted lever having a pawl to engage and rotate the ratchet, a spring for tensioning the lever, said lever having one end formed to provide a handle, a stop to engage the opposite end of the lever to limit downward movement of the handle end thereof, a bell crank pivoted below the lever, a link connecting one arm of the bell crank to the lever, a sliding rack, cutter means, a shaft, means operated by the shaft to slide the rack, means also actuated by the shaft to actuate the cutter means, a ratchet connected to the shaft, a pawl engaging the last named ratchet, and a link connecting the other arm of the bell crank to the last named pawl.

6. In a machine for making sticks from plastic material, a frame, a plunger, a barrel receiving the plunger, die means on the frame having a socket to receive and support the discharge end of the barrel against downward movement, means to slidably mount the plunger, there being free space between the plunger mounting means and the inlet end of the barrel to allow the plunger to be moved into said space and the discharge end of the barrel then moved out of the socket, the barrel being held engaged within the socket solely by the plunger pressing upon the plastic material in the barrel.

In testimony whereof I have affixed my signature in the presence of two witnesses.

LOUIS LUCAS.

Witnesses:
C. V. SWANSON,
L. M. BALDWIN.